US006526489B1

(12) United States Patent
Kikuchi et al.

(10) Patent No.: US 6,526,489 B1
(45) Date of Patent: Feb. 25, 2003

(54) DATA STORAGE APPARATUS WITH IMPROVED SECURITY PROCESS AND PARTITION ALLOCATION FUNDS

(75) Inventors: Yoshihide Kikuchi, Tokyo (JP); Masanobu Akagi, Tokyo (JP)

(73) Assignee: NEC Corporation, Tokyo (JP)

( * ) Notice: Subject to any disclaimer, the term of this patent is extended or adjusted under 35 U.S.C. 154(b) by 115 days.

(21) Appl. No.: 09/711,077

(22) Filed: Nov. 14, 2000

Related U.S. Application Data

(63) Continuation of application No. 08/912,791, filed on Aug. 18, 1997, now Pat. No. 6,219,771.

(30) Foreign Application Priority Data

Aug. 30, 1996 (JP) .............................................. 8-230895

(51) Int. Cl.[7] .............................................. G06F 12/00
(52) U.S. Cl. ........................ 711/164; 711/112; 713/202
(58) Field of Search ................................ 711/112, 163, 711/164, 147, 154; 713/200, 201, 202; 707/1, 9; 709/225

(56) References Cited

U.S. PATENT DOCUMENTS

| 4,858,117 A | * | 8/1989 | DiChiara et al. ............ 711/208 |
| 5,018,096 A | * | 5/1991 | Aoyama ...................... 711/164 |
| 5,237,658 A | | 8/1993 | Walker et al. ................. 710/38 |
| 5,263,158 A | * | 11/1993 | Janis ............................. 707/1 |
| 5,469,564 A | | 11/1995 | Junya ............................. 380/4 |
| 5,491,827 A | * | 2/1996 | Holtey ......................... 711/163 |
| 5,537,543 A | | 7/1996 | Itoh et al. ....................... 714/48 |
| 5,610,981 A | * | 3/1997 | Mooney et al. ............... 380/25 |
| 5,657,470 A | * | 8/1997 | Fisherman et al. ......... 711/153 |
| 5,664,098 A | * | 9/1997 | Bianchi et al. .............. 713/200 |
| 5,734,718 A | | 3/1998 | Prafullchandra ............... 380/4 |
| 5,745,555 A | | 4/1998 | Mark ....................... 379/93.03 |
| 5,757,916 A | | 5/1998 | MacDoran et al. ........... 380/25 |
| 5,771,291 A | * | 6/1998 | Newton et al. .............. 713/185 |
| 5,778,068 A | | 7/1998 | Johnson et al. ................ 380/25 |
| 5,799,206 A | | 8/1998 | Kitagawa et al. ............. 710/36 |
| 5,802,590 A | | 9/1998 | Draves ......................... 380/25 |
| 5,805,880 A | * | 9/1998 | Pearce et al. ................... 713/2 |
| 5,809,230 A | * | 9/1998 | Pereira ........................ 713/200 |
| 5,813,006 A | | 9/1998 | Polnerow et al. ............. 707/10 |
| 5,944,794 A | * | 8/1999 | Okamoto et al. ........... 709/225 |
| 6,070,243 A | | 5/2000 | See et al. .................... 713/201 |
| 6,088,451 A | | 7/2000 | He et al. ....................... 380/25 |
| 6,134,549 A | * | 10/2000 | Regnier ......................... 707/9 |
| 6,226,749 B1 | * | 5/2001 | Carloganu et al. .......... 713/201 |

FOREIGN PATENT DOCUMENTS

| JP | 63-112861 | 5/1988 |
| JP | 64-66729 | 3/1989 |
| JP | 4-58349 | 2/1992 |
| JP | 4-64985 | 2/1992 |
| JP | 4-324542 | 11/1992 |
| JP | 5-27421 | 10/1993 |
| JP | 7-44481 | 2/1995 |

* cited by examiner

Primary Examiner—Matthew Kim
Assistant Examiner—Pierre-Michel Bataille
(74) Attorney, Agent, or Firm—Sughrue Mion, PLLC (57) ABSTRACT

The apparatus enables access authorization to be assigned solely to specific host devices. A control device comprises: an address registration unit, in which the host address of each host device has been registered for authorizing access, a command interpretation and execution unit which on receipt of a command from a host device via a host device interface outputs the host address of the host device based on the command, and an address verification unit for verifying the host address output from a command interpretation and execution unit against the host address registered in the address registration unit, as well as determining whether or not the particular host device has access authorization. The command interpretation and execution unit incorporates an authorization pending function, so that on receipt of a command from a host device, the command is interpreted and executed only after access is authorized by the address verification unit.

2 Claims, 5 Drawing Sheets

DATA STORAGE APPARATUS WITH IMPROVED SECURITY PROCESS AND PARTITION ALLOCATION FUNDS

This application is a continuation of U.S. patent application Ser. No. 08/912,791 filed Aug. 18, 1997, now U.S. Pat. No. 6,219,771.

BACKGROUND OF THE INVENTION

1. Field of the Invention

The present invention relates to a disk apparatus, and in particular to a disk apparatus which can be accessed by a plurality of host devices.

2. Description of the Related Art

With conventional disk apparatus, each host controls the disk or disk array directly, and disk security is controlled by the host device to which the disk is connected. File sharing with this type of file server client system is disclosed for example in Japanese Patent Application, First Publication No. Hei-4-58349.

Figure 6:
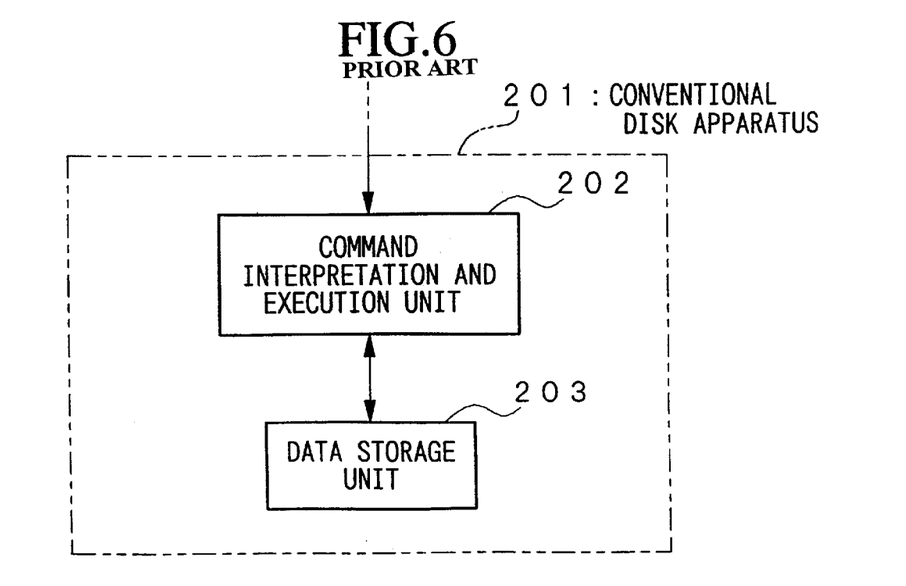
FIG. 6 is a block diagram showing a configuration based on current technology.

A block diagram showing the configuration of a conventional disk apparatus is shown in FIG. 6. A conventional disk apparatus 201 comprises a command interpretation and execution unit 202 which interprets commands from a host device as well as executing those commands, and a data storage unit 203 in which data is stored. The command interpretation and execution unit 202, in the case of a read command for example, interprets the command, and recognizing the command as a read command directs the data storage unit 203 to read. The data storage unit 203 reads the stored data based on the read directions from the command interpretation and execution unit 202, and then transfers the data to the host device.

Common ways of connecting the host device and the disk apparatus include a SCSI (Small Computer System Interface) and Fibre Channel. Consequently, the command interpretation and execution unit 202 interprets commands from the SCSI or Fibre Channel and then outputs commands such as read and/or write, to the disk data storage unit 203.

With this type of conventional disk apparatus, usually a single host device is connected to the disk apparatus. Furthermore, even in those cases where a plurality of host devices are connected to a common disk interface, with current technology it is possible for any of the host devices to access the disk.

With advances in technology relating to the interface between the host device and the disk apparatus however, it has become feasible to connect a plurality of host devices. Using Fibre Channel, it is possible for example to use loops (FC-AL) to connect together more than 100 devices including both host devices and disk apparatus. Moreover, if switching fabric is employed the number of devices which can be connected together increases even further. Utilizing the high speed of interfaces, it is also possible to connect a plurality of host devices and disk apparatus to a single interface. With conventional disk apparatus, a problem arises that in the case where a single disk is able to be accessed by a plurality of hosts devices, access authorization can not be restricted to specific host devices.

Furthermore, with the move to large volume disk apparatus, it is possible to consider partitioning a single disk and then having each host use a different partition, but with conventional disk apparatus it has not been possible, while using a single interface, to identify a host device and then have each host device use a different partition.

SUMMARY OF THE INVENTION

It is an object of the present invention to improve the deficiencies inherent in the conventional devices discussed above, and in particular to provide a disk apparatus in which each host device can be treated differently, so that for example access authorization can be assigned solely to specific host devices, or furthermore, each host device can gain access to a different partition while using the same interface.

A first apparatus according to the present invention comprises: a host device interface for sending and receiving data to and from a plurality of host devices, a data storage device for storing data to be sent to a host device, and a control device for controlling the writing of data to, and the reading of data from, the data storage device.

The control device comprises an address registration unit, in which the host address of each host device has been registered in advance, for the purpose of authorizing access, a command interpretation and execution unit which on receipt of a command from a host device via the host device interface outputs the host address of the host device based on the command, and an address verification unit for verifying the host address output from the command interpretation and execution unit against the host address registered in the address registration unit, and for determining whether or not the particular host device has access authorization. The command interpretation and execution unit is configured to include an authorization pending function, so that on receipt of a command from a host device, the command is interpreted and executed only after access is authorized by the address verification unit.

With this first apparatus, the host address is extracted from the command sent from a host device and verified against those host addresses registered in the address registration unit for the purpose of determining access authorization. As a result, if access is authorized, the disk apparatus accepts the command which has been sent and disk read/write functions are performed. In this way, only authorized host devices gain access to the data storage unit.

As a second apparatus according to the present invention a construction is adopted where, in addition to the items which characterize the first apparatus, a host information storage unit in which information about the hosts such as host names and passwords is stored, is incorporated into the address registration unit, and a host check unit which, on receipt of host information from a host, determines whether or not that particular host has access authorization based on the host information received from the host and the host information stored in the host information storage unit, is incorporated into the command interpretation and execution unit, and this host check unit incorporates an address registration function which registers the access authorization based on the host information, and the host address determined for the host device, in the address registration unit.

With this second apparatus, when a host device logs in to the disk apparatus seeking authorization to use the disk, the address is registered in the address registration unit, and subsequently, the host address is extracted from any commands sent from the host device and verified against the host address registered in the address registration unit, and in those cases where access is authorized the command interpretation and execution unit transmits the command from the host device to the data storage unit and executes the command. In this way, any alterations in host address can be easily accommodated.

With a third apparatus, a construction is adopted where in addition to the items which characterize the second apparatus, the host check unit incorporates a startup setting function which requests host information from a plurality of host devices when the control device is activated.

With this third apparatus, host information relating to access authorization is not stored internally beforehand, but rather is sent from the host devices which control the disk at the point of disk startup. Consequently, the amount of non volatile memory set aside for data storage can be reduced.

As a fourth apparatus according to the present invention a construction is adopted where, in addition to the items which characterize the first apparatus, the control device comprises: an offset information generation unit, which on the basis of a host address output from the command interpretation and execution unit generates offset information for the disk partition for that particular host device, and an actual partition address generation unit which on the basis of the address for reading and writing to the disk apparatus, and the offset information, generates an actual disk partition address and then outputs that actual partition address to the command interpretation and execution unit.

With this fourth apparatus, the disk capacity is partitioned amongst the various host devices, and the various host addresses and the offset information for each partition are coordinated beforehand. When a command is received from a host device, the command interpretation and execution unit extracts the host address from the command and sends it to the offset information generation unit. The offset information generation unit then uses a correlation chart of host devices and offset information which has been stored in advance, and generates offset information which corresponds to the particular host device and sends this information to the actual partition address generation unit. The actual partition address generation unit combines the theoretical disk address included in the command from the host device and the offset information, and generates an actual disk partition address. In this way, the disk partition corresponding to the host device from which the command was sent is accessed.

DESCRIPTION OF THE PREFERRED EMBODIMENTS

Next is a description of the preferred embodiments of the present invention, with reference to the drawings.

First Embodiment

Figure 1:
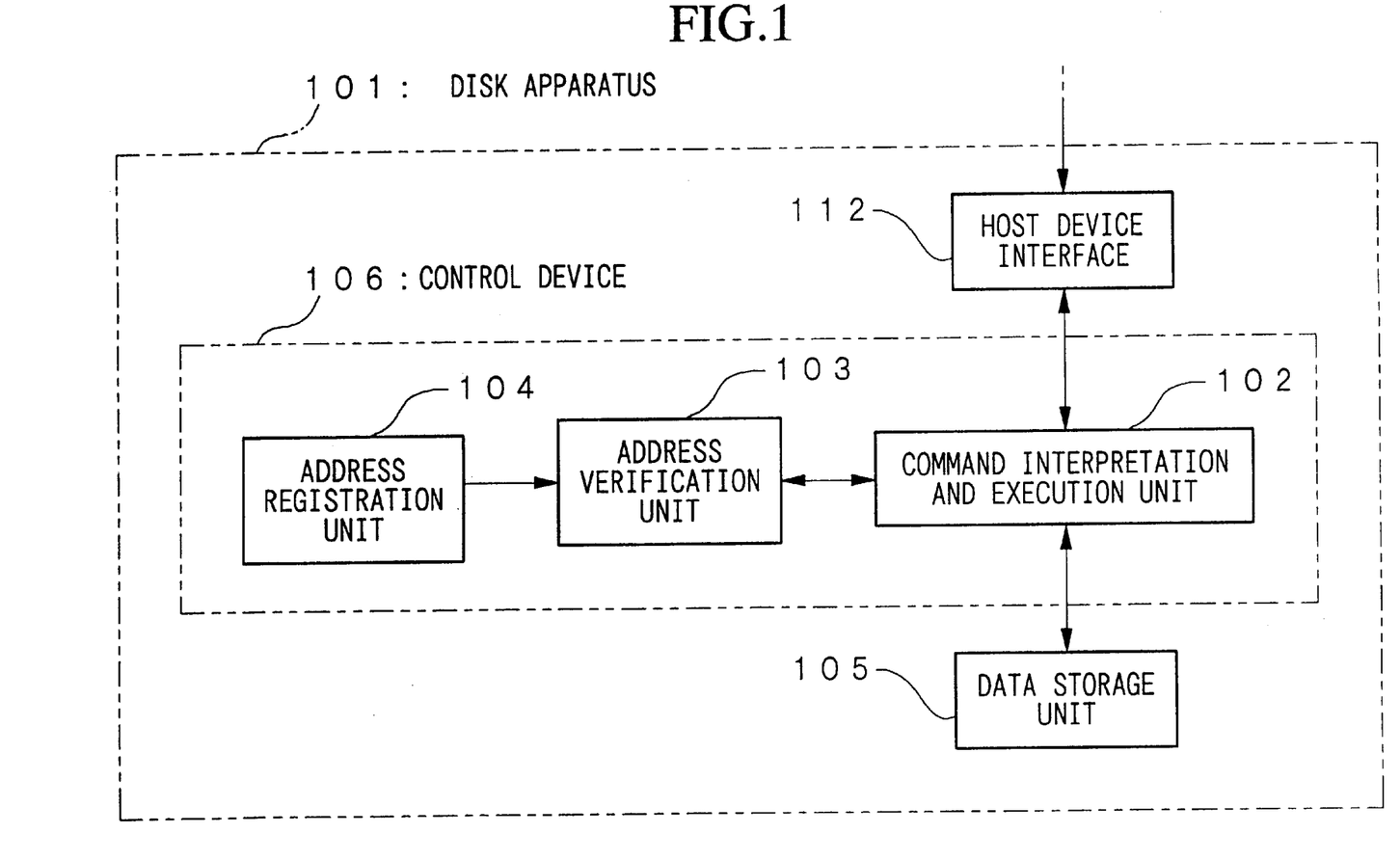
FIG. 1 is a block diagram showing the configuration of a first embodiment of the present invention.

A block diagram showing the configuration of a disk apparatus according to a first embodiment of the present invention is shown in FIG. 1. As is shown in FIG. 1, a disk apparatus 101 comprises a host device interface 112 for sending and receiving data to and from a plurality of host devices, a data storage device (data storage unit) 105 for storing data to be sent-to a host device, and a control device 106 for controlling the writing of data to, and the reading of data from, the data storage device 105.

The control device 106 comprises: an address registration unit 104, in which the host address of each host device has been registered for authorizing access, a command interpretation and execution unit 102 which on receipt of a command from a host device via the host device interface outputs the host address of the host device based on the command, and an address verification unit 103 for verifying the host address output from the command interpretation and execution unit 102 against the host address registered in the address registration unit 104, and for determining whether or not the particular host device has access authorization.

The command interpretation and execution unit 102 incorporates an authorization pending function, so that on receipt of a command from a host device, the command is interpreted and executed only after access is authorized by the address verification unit 103.

The command interpretation and execution unit 102 first receives a command from a host device, extracts the host address from the command and outputs it to the address verification unit 103. The address verification unit 103 reads the host addresses stored in the address registration unit 104 for the purpose of determining access authorization and verifies the host address sent from the command interpretation and execution unit 102. The access authorization information generated as a result of this verification process is then relayed back to the command interpretation and execution unit 102 by the address verification unit 103.

In those cases where access is authorized, the command interpretation and execution unit 102 sends the command received from the host device to the data storage unit 105, and the disk apparatus command, such as a data read/write command, is carried out in the same manner as for conventional disks.

The technique for determining access authorization could for example involve the registration of the host addresses of those host devices for which access is authorized in the address registration unit 104 and comparison of these address with the host address extracted from each command, with authorization being given in the case of a matching address. Alternatively, the host addresses of those host devices for which access is not authorized could be registered in the address registration unit 104, and authorization given if the host address extracted from the command did not match any of the registered addresses.

With the above example it was assumed that the host address was imbedded in the command, but in practice, the host address can sometimes be identified in exchanges prior to, or after the command. An example is presented in way of an explanation below.

Figure 2:
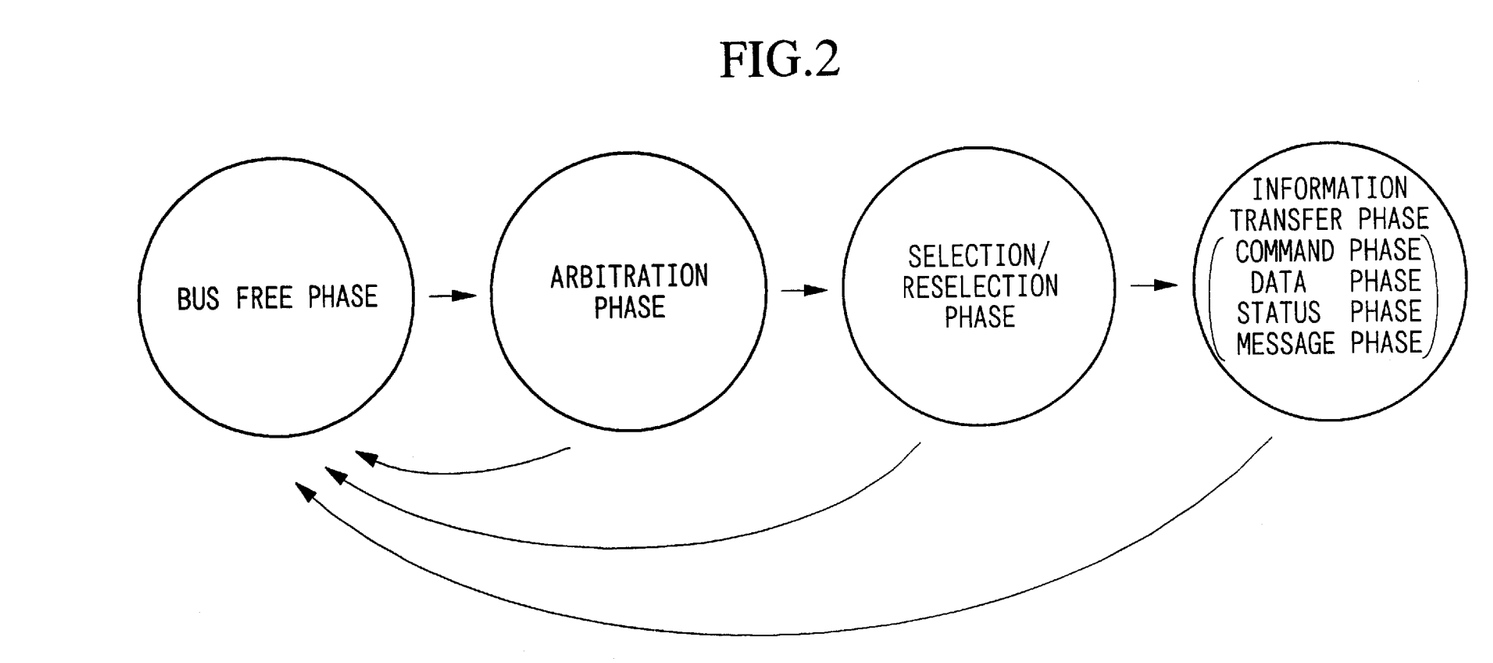
FIG. 2 is an explanatory diagram displaying a phase transition state of a SCSI bus.

For example in the case of a SCSI, the bus phase can be roughly divided up as shown in FIG. 2. With a SCSI generally the host device interface is the initiator and the disk apparatus interface the target. When sending a command to the disk apparatus, the host device interface, the initiator, secures the bus in the arbitration phase, selects the disk apparatus in the selection phase, and then enters the information transfer phase for sending the command or data.

Within this series of phases, the initiator outputs its own ID and the ID of the target it is aiming to select in the selection phase. The specified disk apparatus, namely the target, on confirming it has been selected corresponds by switching the bus BSY signal to "true". At this point, the target samples the data bus and identifies the ID of the initiator.

In this way, the disk apparatus is able to ascertain the SCSI ID, namely the host address, of the other device. Further details are given in "Open design No. 1" (Published by CQ, 1994), pages 4 to 19.

In the case of a Fibre Channel, because communication is serial, the host address is recorded within the frame and so once again the disk apparatus is able to ascertain the host address of the other device.

Furthermore nowadays, in addition to those mentioned above, there are other protocols (such as IP (Internet Protocol)) which although not widely used as disk interfaces, do include a host address which becomes the transmission source.

Figure 3:
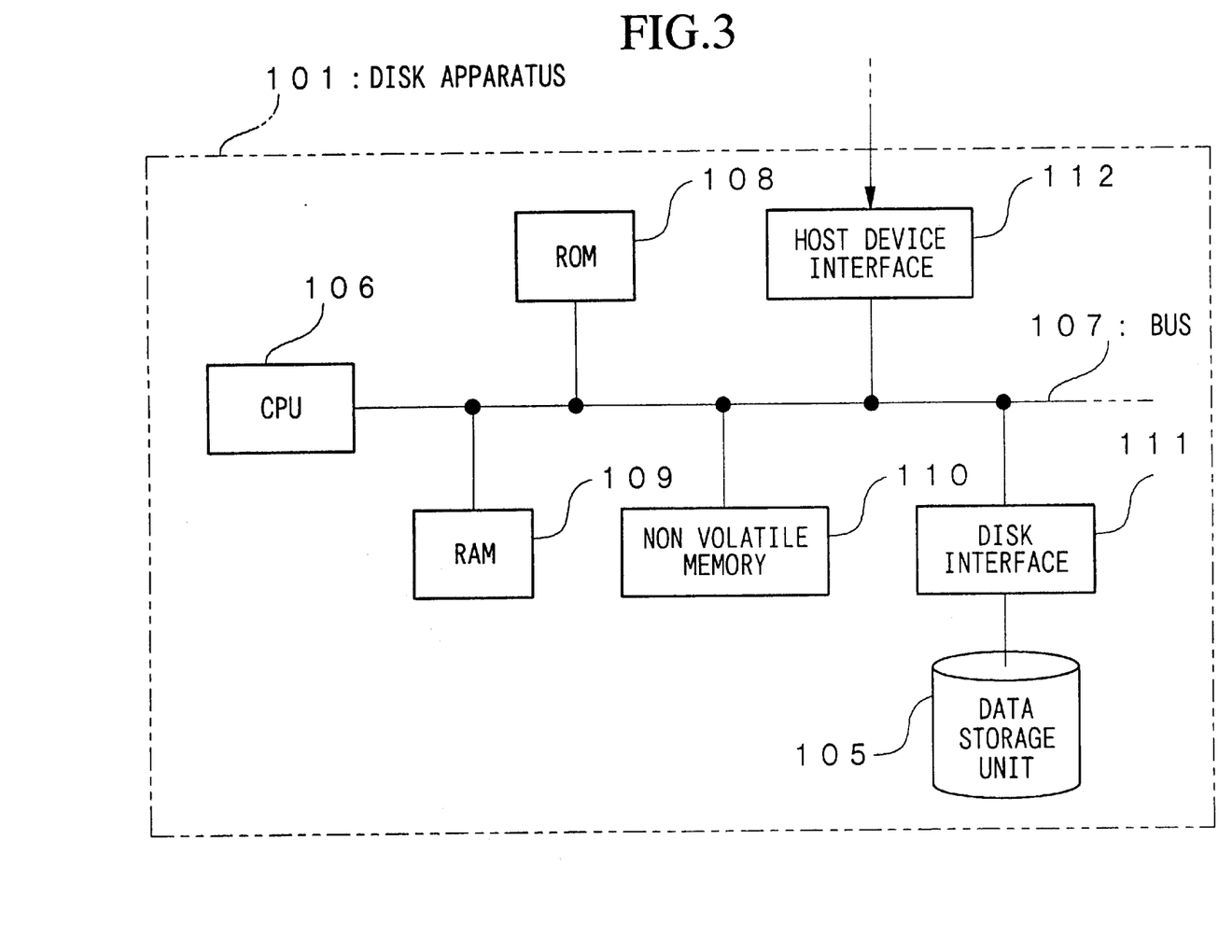
FIG. 3 is a block diagram showing an example configuration of hardware resources of a disk apparatus according to the first embodiment shown in FIG. 1.

An example configuration of the above embodiment which uses a general purpose CPU (central processing unit) is shown in FIG. 3. A disk apparatus 101 comprises a CPU 106 which performs the centralized function of controlling reading and writing. The CPU 106 is connected to various circuit devices via a bus 107. Of these devices, a ROM (read only memory) 108 is memory solely for reading, and stores various programs and fixed data.

A RAM (random access memory) 109 is memory which is used, as required, for temporarily storing data during execution of a program.

A non volatile memory 110 is memory which can be written to by the CPU, and the content of which is saved when the power is turned off. A disk interface 111 is an interface for exchanging data and commands between the CPU and a data storage unit 105 which will be either a disk or some other storage medium.

A host device interface 112 is an interface for exchanging commands and data from a host device with the disk apparatus 101. In the case of a disk array, a SCSI is used for both the host device interface 112 and for the disk interface 111, but generally it is acceptable for the host device interface 112 and the disk interface 111 to be of different types.

For example, a Fibre Channel could be used for the host device interface 112 and a SCSI used for the disk interface 111. In small apparatus the disk storage medium itself is used as the data storage unit 105, but in large apparatus such as disk arrays the disk drive itself can be used as the data storage unit 105.

Next is a description of the use of the hardware resources shown in FIG. 3 to bring to realization the function blocks of FIG. 1. The command interpretation and execution unit 102 of FIG. 1 is configured using the CPU 106, the bus 107, the ROM 108, the RAM 109, the disk interface 111 and the host device interface 112 of FIG. 3. Similarly, the address verification unit 103 is configured using the CPU 106, the bus 107, the ROM 108, and the RAM 109.

The address registration unit 104 can be configured using the non volatile memory 110. Moreover, a read/write capable disk drive can be used as the data storage unit 105. In those instances where a disk drive with a SCSI interface is used as the data storage unit, the commands which can be sent from the command interpretation and execution unit 102 to the data storage unit 105 are not limited to just read and write commands for data, but can also indicate commands in general retained by the SCSI interface. Furthermore, the disk drive can comprise any form which allows data storage, and can therefore be configured from memory with a power backup function or from non volatile memory.

Next is a description of the operation of a disk apparatus configured as shown in FIG. 3. First, host addresses are stored in advance in the non volatile memory 110. The stored host addresses can be rewritten by the CPU 106, but will not be erased when the power is switched off. Consequently, when power is supplied to the disk apparatus 101, the host addresses which have been previously stored are able to be read out.

The command interpretation and execution unit 102 of FIG. 1 receives commands from the host devices at the host device interface 112 and stores them temporarily in the RAM 109. The CPU 106 uses the programs stored in the ROM 108 for interpreting a command from a host device and extracting the host address. The thus extracted host address is then verified against the host addresses stored in the non volatile memory 110 by the CPU 106. In the method where the host addresses for those devices which are authorized for access are stored in the non volatile memory 110, access is authorized when the host address extracted from the command from the host device matches one of the host addresses stored in advance in the non volatile memory.

In those cases where access is authorized, the CPU 106 sends a command to the disk interface 111 in order to execute the command from the host device, which had been temporarily stored in the RAM 109. The disk interface 111 executes the command by sending it to the data storage unit 105. In those cases where information needs to be relayed to the host device as a result of the command being executed, the disk interface informs the CPU 106 that it has received a result.

On receiving this notification the CPU 106 receives the result from the disk interface 111, stores it temporarily in the RAM 109, and then transfers the result to the host device interface. In this way, commands from a host device are first judged as to whether access is possible, and then following execution, any result of the execution is returned to the host device.

With the above example, the host address stored temporarily in the RAM 109 and the access authorization determining host addresses stored in the non volatile memory 110 were compared, but in some cases the reading of non volatile memory is time consuming, and so it is possible to imagine a technique where on startup of the disk apparatus the access authorization determining host addresses stored in the non volatile memory 110 are transferred to the RAM 109.

Furthermore as with the invention of the first apparatus, it is possible to imagine a technique where on startup of the disk apparatus the access authorization determining host addresses are transferred from the host device which controls the disk, and then stored in the RAM 109. With this technique, the amount of non volatile memory 110 can be greatly reduced.

Second Embodiment

Figure 4:
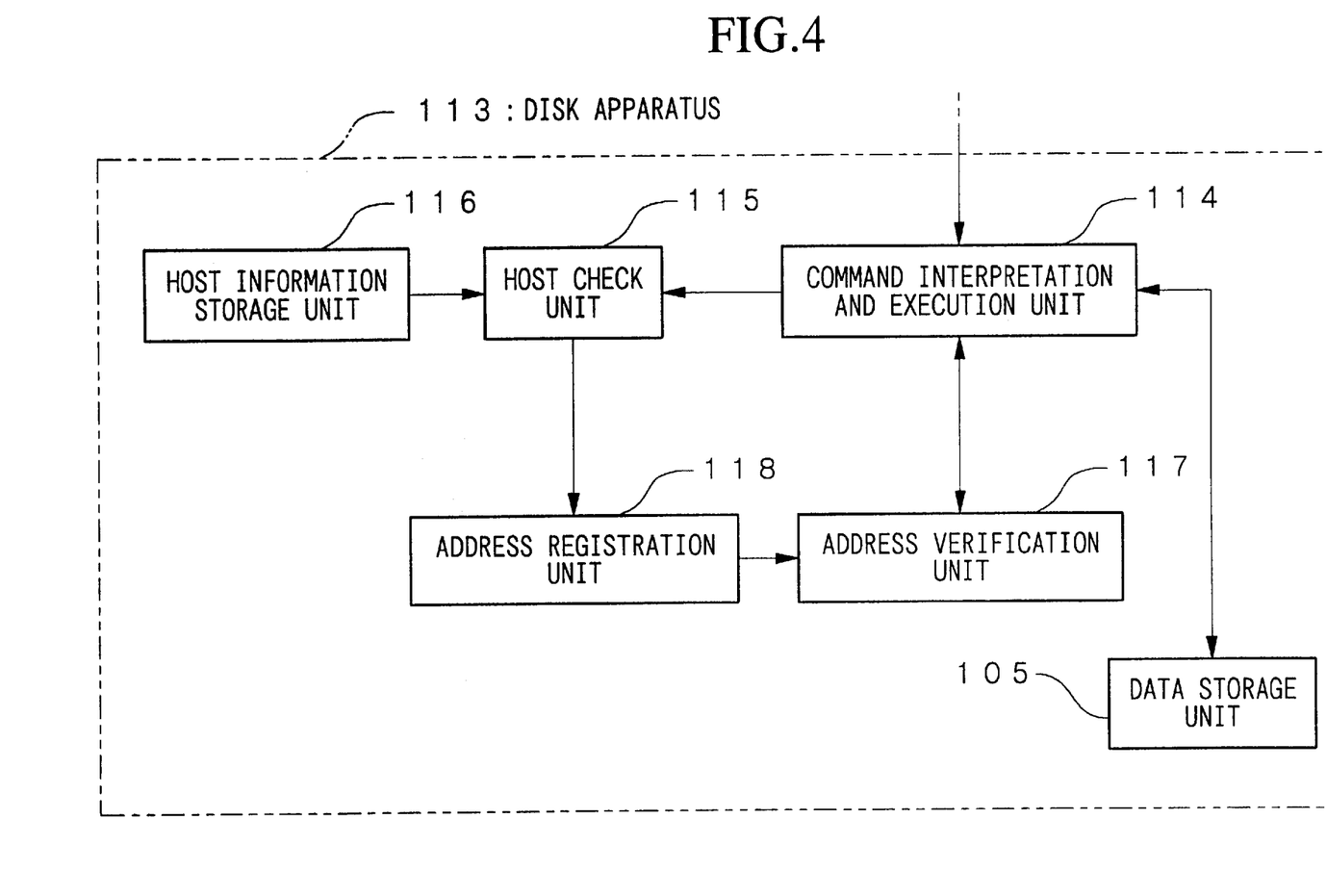
FIG. 4 is a block diagram showing the configuration of a second embodiment of the present invention.

A block diagram showing the configuration of a disk apparatus according to a second embodiment of the present invention is shown in FIG. 4. This is an embodiment which allows the setting of the host address afterwards. This embodiment will be explained in terms of the login operation from a host device to obtain authorization for using the disk apparatus, and the normal access operation.

First, in the login operation, the host information sent from a host device is used to determine whether that particular host device should be authorized. A disk apparatus 113 of this embodiment comprises a command interpretation and execution unit 114 for interpreting and executing commands from host devices. The command interpretation and execution unit 114 receives a command from a host device and extracts the necessary host information required to authorize usage of the disk apparatus as well as the host address accompanying that host information, and sends it all to a host check unit 115.

In the host check unit 115, this information is verified against access authorization determining host information which has been stored in advance in a host information storage unit 116. Examples of host information include the host device name, and a password. In those cases where the comparison results in a match, the host address sent from the command interpretation and execution unit 114 is registered in an address registration unit 118 as an access authorization determining address.

Once the host address has been registered in the address registration unit 118 in this way, the remaining operation is the same as for the first embodiment. Upon receiving a command from a host device the command interpretation and execution unit 114 extracts the host address from the command. It then sends this address to an address verification unit 117 and the address verification unit 117 verifies the address against the access authorization determining host addresses stored in the address registration unit 118 and then relays an access authorized or access denied message back to the command interpretation and execution unit 114. In the case where access is authorized, the command interpretation and execution unit 114 sends a command to the data storage unit 105 in order to execute the command.

With the second embodiment, the actual circuit configuration could take the form shown in FIG. 3, as was the case with the first embodiment. The command interpretation and execution unit 114 of FIG. 4 could then be configured comprising the CPU 106, the bus 107, the ROM 108, the RAM 109, the disk interface 111, and the host device interface 112 of FIG. 3. Similarly, the host check unit 115 and the address verification unit 117 can be configured comprising the CPU 106, the bus 107, the ROM 108, and the RAM 109. Furthermore, the host information unit 116 and the address registration unit 104 an be configured using the non volatile memory 110.

Third Embodiment

Figure 5:
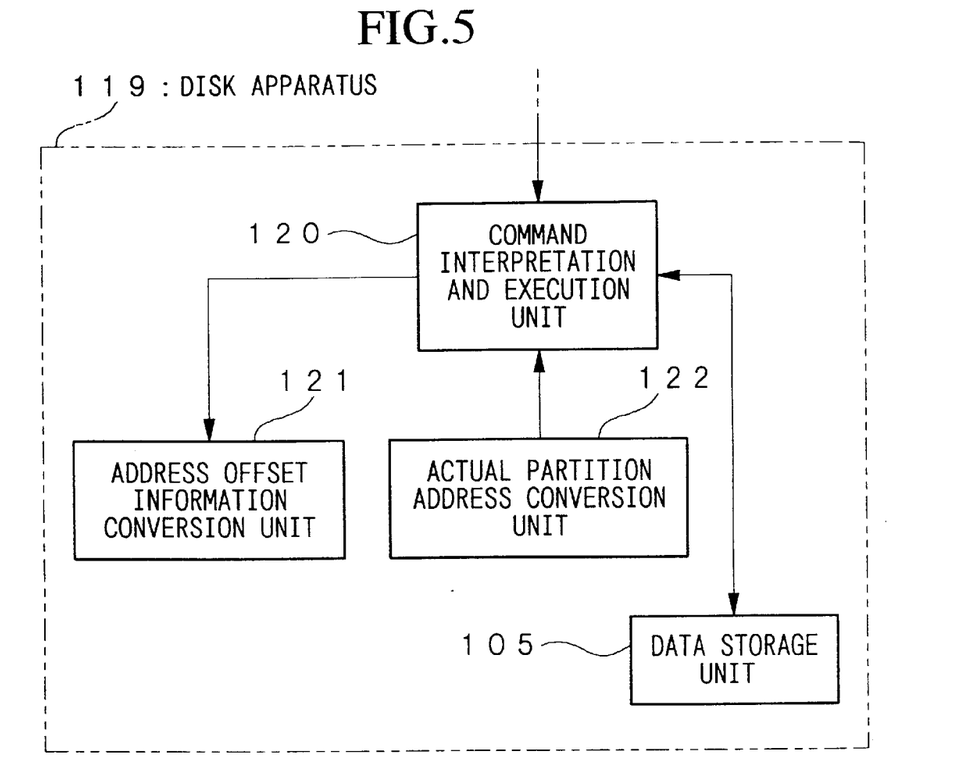
FIG. 5 is a block diagram showing the configuration of a third embodiment of the present invention.

A block diagram showing the configuration of a disk apparatus according to a third embodiment of the present invention is shown in FIG. 5. A disk apparatus 119 of this embodiment comprises a command interpretation and execution unit 120 for interpreting and executing commands from a host device. The command interpretation and execution unit 120 extracts a host address from any disk read/write command sent from a host device and outputs it to an address offset information conversion unit 121, and also outputs a disk partition address extracted from the read/write command to an actual partition address conversion unit 122.

The technique used by the command interpretation and execution unit 120 for extracting a host address is as was outlined for the first embodiment. The host address output from the command interpretation and execution unit 120 is input into the address offset information conversion unit 121. Offset information which indicates a disk partition corresponding to each host device, has been stored in advance in the address offset information conversion unit 121, and the host address input from the command interpretation and execution unit 120 is converted to this offset information.

The actual partition address conversion unit 122 combines the disk partition address output from the command interpretation and execution unit 120 with the offset information output from the address offset information conversion unit 121, and generates an actual disk partition address which it then outputs to the command interpretation and execution unit 120. The command interpretation and execution unit 120 outputs a read/write command to the data storage unit 105 based on the actual disk partition address. The data storage unit 105 executes the command output from the actual partition address conversion unit 122 by, for example, reading out data to the host device, or receiving and storing data from the host device.

The present invention is configured and functions in the manner outlined above, with the invention of the first apparatus enabling the provision of a highly secure and advanced disk apparatus of a type not currently available, wherein determination of access authorization for a host device is based on the host address imbedded in the command sent from that particular host device, thus enabling commands to be accepted only from specified host devices.

With the invention of the second apparatus, the information registered in advance in the disk apparatus by the user is not host addresses, but rather host information. Each host address is registered prior to that host device using the disk apparatus, so that once registered, subsequent recognition of the host device can be based on the host address imbedded in normal commands. Therefore procedures can be vastly simplified in comparison with the technique where host information is exchanged each time the disk apparatus is accessed. Furthermore, because the information registered in advance in the disk apparatus does not include host addresses, even if the interface configuration or address is changed there is little effect, allowing high security to be maintained.

With the invention of the third apparatus, following disk startup the host addresses relating to access authorization are received from the host device which controls the disk apparatus, and stored internally. This offers the advantage that complicated programming relating to host address registration does not need to be provided on the disk.

With the invention of the fourth apparatus, the disk apparatus is able to identify a host device from the host address imbedded within the command sent from the host device. Moreover because a partition offset information value is stored for each host device, the disk apparatus is able to allocate a different disk partition to each host device. Consequently, a single disk apparatus can essentially appear as a different disk to each host device, enabling the efficient usage of modern large volume disk apparatus.

What is claimed is:

1. A disk apparatus comprising, a host device interface for sending and receiving data to and from a plurality of host devices, data storage means for storing data to be sent to said host devices, and control means for controlling the writing of data to, and the reading of data from, said data storage means, characterized in that said control device comprises: an address registration unit, in which the host address of each host device has been registered in advance, for the purpose of authorizing access, a command interpretation and execution unit, which on receipt of a command from a host device via said host device interface outputs the host address of said host device based on said command, and an address verification unit for verifying the host address, output from said command interpretation and execution unit against said host address of each host device registered in advance in said address registration unit, and for determining whether or not the particular host device has access authorization;

wherein said command interpretation and execution unit incorporates an authorization pending function so that on receipt of a command from a host device the command is interpreted and executed only after access is authorized by said address verification unit; and wherein a host information storage unit which stores information, such as host names and passwords about the host devices, is incorporated into said address registration unit, wherein a host device check unit, which on receipt of host information from a host device, determines whether or not that particular host device has access authorization based on the host information received from the host device and the host information stored in said host information storage unit, is incorporated into said command interpretation and execution unit, and wherein said host check unit incorporates an address registration function which registers the access authorization based on the host information and the host address determined for the host device which are in said address registration unit.

2. A disk apparatus according to claim 1, wherein said host check unit incorporates a startup setting function which requests host information from a plurality of host devices when said control means is activated.

* * * * *